United States Patent [19]

Tanagawa et al.

[11] Patent Number: 5,068,783
[45] Date of Patent: Nov. 26, 1991

[54] MICROCOMPUTER HAVING A BUILT-IN PROM FOR STORING AN OPTIONAL PROGRAM

[75] Inventors: Kouji Tanagawa; Tomoaki Yoshida, both of Tokyo, Japan

[73] Assignee: Oki Electric Industry Co., Ltd., Tokyo, Japan

[21] Appl. No.: 915,804

[22] Filed: Oct. 6, 1986

[30] Foreign Application Priority Data

Oct. 24, 1985 [JP] Japan .................................. 60-238268

[51] Int. Cl.$^5$ .................................................. G06F 11/00
[52] U.S. Cl. .................................. 395/575; 364/232.8; 364/232.9; 364/221.6; 364/221.7; 364/221; 364/DIG. 1
[58] Field of Search ... 364/200 MS File, 900 MS File, 364/513; 371/21, 25

[56] References Cited

U.S. PATENT DOCUMENTS

| | | | |
|---|---|---|---|
| 3,413,613 | 11/1968 | Bahrs et al. | 340/172.5 |
| 3,940,744 | 2/1976 | Mock et al. | |
| 4,034,194 | 7/1977 | Thomas et al. | 235/153 AC |
| 4,127,768 | 11/1978 | Negi et al. | |
| 4,153,933 | 5/1979 | Blume, Jr. et al. | 364/200 |
| 4,167,781 | 9/1979 | Beccia et al. | 364/200 |
| 4,212,059 | 7/1980 | Sato et al. | 364/200 |
| 4,348,761 | 9/1982 | Berger | 371/21 |
| 4,433,143 | 2/1984 | Fasang | 371/25 |
| 4,447,873 | 5/1984 | Price et al. | 364/200 |
| 4,509,143 | 4/1985 | Tajima et al. | 364/900 |
| 4,700,293 | 10/1987 | Grone | 364/200 |
| 4,742,483 | 5/1988 | Morrell | 364/900 |
| 4,752,871 | 6/1988 | Sparks et al. | 364/200 |
| 4,763,276 | 8/1988 | Perreirra et al. | 364/513 |

OTHER PUBLICATIONS

"Adding EEPROM to ROM Expands IC Versatility", EDN, Oct. 13th, 1983, Morales et al., pp. 177–188.

Primary Examiner—Eddie P. Chan
Assistant Examiner—Maria Napiorkowski
Attorney, Agent, or Firm—Spencer & Frank

[57] ABSTRACT

A microcomputer selectively operable in a first mode or a second mode comprises a first read-only memory for storing a first program to be executed in the first mode, a second, programmable read-only memory for storing a second program to be executed in the second mode, an input circuit for inputting the second program to be written in the second read-only memory, an execution circuit for executing the first program or the second program, and a mode control circuit responsive to a mode selection signal for enabling execution of the first program when the mode selection signal designates the first mode and for enabling writing and execution of the second program when the mode selection signal designates the second mode.

16 Claims, 6 Drawing Sheets

MICROCOMPUTER HAVING A BUILT-IN PROM FOR STORING AN OPTIONAL PROGRAM

BACKGROUND OF THE INVENTION

The present invention relates to a microcomputer, such as a single-chip microcomputer with a built-in read-only memory.

A conventional single-chip microcomputer comprises a central processing unit (CPU) including a control unit, an operation unit and a register section, a memory device including a read-only memory (ROM) incapable of re-writing (reprogramming) and a random access memory (RAM) capable of writing and reading, and an input/output (I/O) device, which are all built in an IC chip.

The data processing speed of a microcomputer of this kind is increased year by year, and the minimum instruction execution time is about 1 microsecond in a 4-bit microcomputer, and about 500 nanoseconds in an 8-bit microcomputer. The circuit within a microcomputer is becoming more and more complicated, and accordingly, testing the functioning of the circuit is becoming more and more difficult.

In a conventional test, an external memory in which a test program has been written, is connected to the microcomputer through various terminals. The test mode is set using a control terminal. In this mode, address signals are outputted through input/output terminals and supplied to the external memory, and the test program is read out of the external memory and inputted through other input/output terminals to the microcomputer, and is executed. The test of the internal logic circuits is thereby accomplished.

The above-described microcomputer has the following problems.

When a function test of the microcomputer is conducted, time for outputting the address signals to access the external memory, and time for reading the test program out of the external memory are necessary, so that the execution of the test program is slower than the execution of the instructions of the internal ROM. As a result, it is impossible or very difficult to conduct the test under the same condition as where the internal ROM is operated at the maximum instruction execution speed. The reliability of the test is therefore not sufficient. Moreover, a large number of terminals are required for input/output of the addresses and the instructions. Another shortcoming of the conventional microcomputer is the incapacity of programming after manufacture. To generalize, the conventional microcomputer is not versatile enough for certain applications.

SUMMARY OF THE INVENTION

An object of the invention is to provide a microcomputer whose logic circuits can be tested at a high execution speed and which does not need to have a large number of terminals for the test.

Another object of the invention is to provide a microcomputer having an improved versatility.

A further object of the invention is to provide a method for testing at the same speed as the execution of the program stored in the internal ROM.

According to the invention, there is provided a microcomputer selectively operable in a first mode or a second mode, comprising a first read-only memory for storing a first program to be executed in the first mode, a second, programmable read-only memory for storing a second program to be executed in the second mode, input means for inputting the second program to be written in the second read-only memory, execution means for executing the first program or the second program, and mode control means responsive to a mode selection signal for enabling execution of the first program when the mode selection signal designates the first mode and for enabling writing and execution of the second program when the mode selection signal designates the second mode.

With the arrangement described above, the programmable ROM may be used to store a test program. In such a case, when the second mode is selected, instructions for the test program are written in the programmable ROM, and are then read out and executed at the same speed as in the first mode. The various problems which were previously described are thereby solved.

As an alterative to the test program, an application program may be stored in the programmable ROM. Such an application program may be an addition to the application program stored in the ROM, in such a case, the additional application program is stored in the programmable ROM to provide an optional function thereby meeting; same line the special requirements for a particular use.

DETAILED DESCRIPTION OF THE PREFERRED EMBODIMENTS

Figure 1:
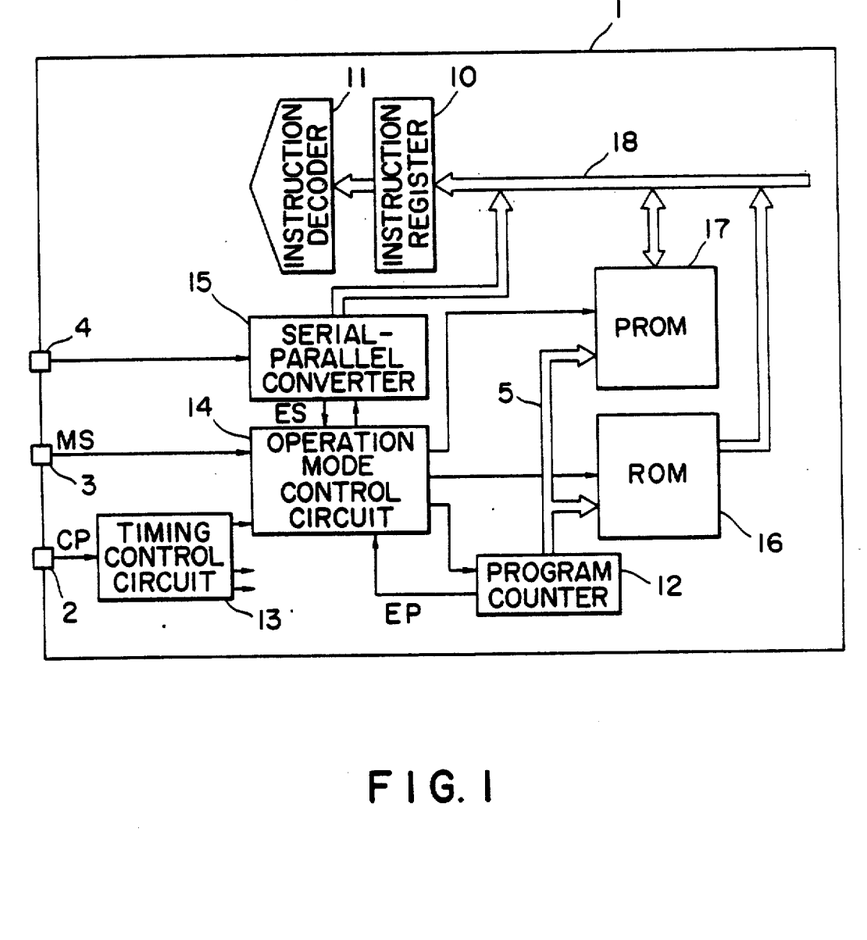
FIG. 1 is a block diagram showing an embodiment of a microcomputer according to the present invention.

A microcomputer of an embodiment shown in FIG. 1 is a single-chip microcomputer 1 and comprises a mask ROM 16 which is programmed during fabrication. The programs stored in the mask ROM 16 may include an ordinary application program of a type provided for a microcomputer of this particular design.

There is also provided a programmable ROM (PROM) 17 which can be programmed after fabrication. The PROM 17 is preferably an electrically erasable PROM (EEPROM) which can be programmed and erased by application of a voltage, e.g., 21V higher than the normal operating voltage, e.g., 5V. However, other types of PROM's, such as an EPROM may also be used. The PROM may be used to store a test program for testing the logical circuits of the microcomputer or an optional application program, which may be one used in conjunction with the application program stored in the mask ROM 16. For example, if the application program stored in the ROM 16 is a standard program for controlling a VTR (video tape recorder), the program stored in the PROM 17 may be a program for the additional functions of VTR control which may differ from one user (VTR manufacturer) to another, or from one type of VTR to another.

The address input terminals of the mask ROM 16 and the PROM 17 are connected through an address bus 5 to a program counter 12, which contains the address of the next instruction to be fetched and executed. The address contained in the program counter is automatically incremented each time an instruction is fetched.

The data output terminals of the mask ROM 16 and the data input/output terminals of the PROM 17 are connected to a data bus 16, which in turn is connected to an instruction register 10. An instruction fetched from the ROM 16 or the PROM 17 is temporarily held in the instruction register 10. An instruction decoder 11 decodes the instruction held in the instruction register 10 and produces control signals, not shown, to execute the instruction. Although there are also provided a RAM (random access memory) used as a data memory, an ALU (arithmetic logic unit) and registers which are essential for operation of a microcomputer, these are not illustrated since they are well-known and are not features of the invention.

Figure 2:
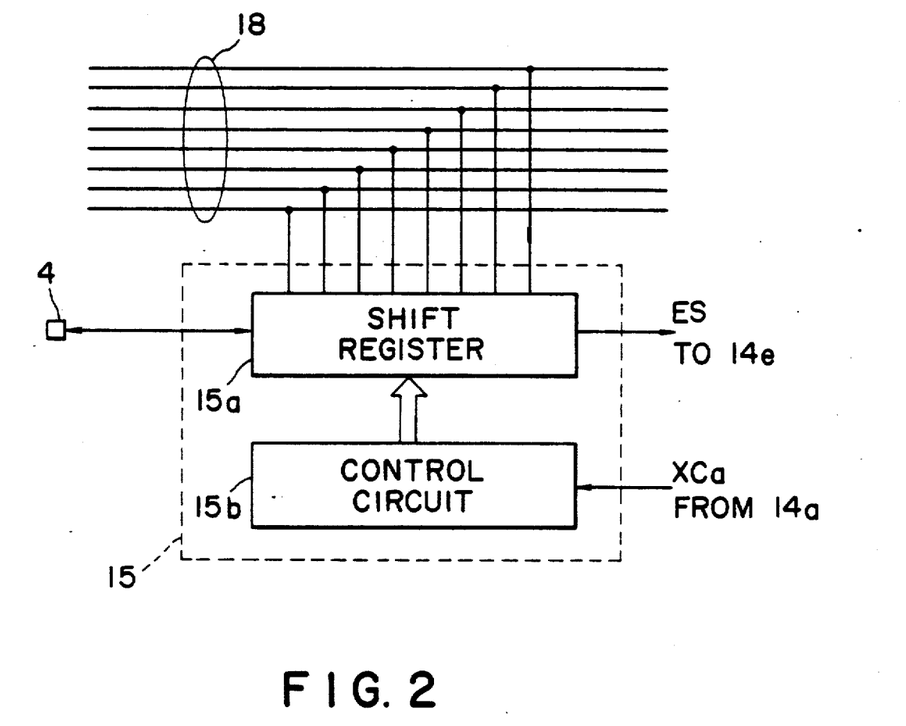
FIG. 2 is a block diagram showing an example of the serial-parallel converter of FIG. 1.

An input/output terminal 4 is provided for input of a program (e.g., a test program) to be stored in the PROM 17. In the illustrated embodiment, bits forming instructions of the program are serially inputted into the chip 1 through the terminal 4. A serial-parallel converter 15 converts the serially transmitted bits into a set of parallel bits forming an instruction. An example of the serial-parallel converter 1b is shown in FIG. 2. As illustrated, the serial-parallel converter 1b comprises a shift register 15a and a control circuit 15b. The shift register 15a, under control of the control circuit 15b, converts the serially transmitted bits into parallel bits. In the example shown, the data bus 18 comprises 8 lines, and the shift register 15a therefore has 8 stages respectively connected to the 8 lines of the data bus 18. Each time 8 bits of information forming an instruction have been serially inputted into the shift register 15a and held at the respective stages of the shift register 15a, the contents at the respective stages are outputted onto the data bus 16. Simultaneously, a timing signal ES is produced from the shift register. This timing signal ES is used to make the PROM 17, etc. ready for writing the instruction.

The shift register 15a and the control circuit 15b are also used to convert the parallel data on the data bus 18 into serial data and to output the serial data through the input/output terminal 4. For instance, during execution of a test program, data indicating the result of the test may be outputted through the input/output terminal 4. This allows the result of the test to be judged outside the microcomputer.

An operation mode controller 14, as shown in FIG. 1 is connected to receive a mode selection signal MS inputted through a mode selection terminal 3. The mode selection signal MS is at "0" when a first or an ordinary mode is selected, and is at "1" when a second or a special mode is selected. The operation mode control circuit 14 delivers the mode selection signal MS to various circuits within the microcomputer, including the ROM 16, the PROM 17 and the program counter 12 to cause them to operate in the ordinary mode or the special mode.

When the mode selection signal MS rises to "1" the program counter 12 is initialized, e.g., set to have the address value of zero, and the PROM 17 is made ready for operation.

Figure 3:
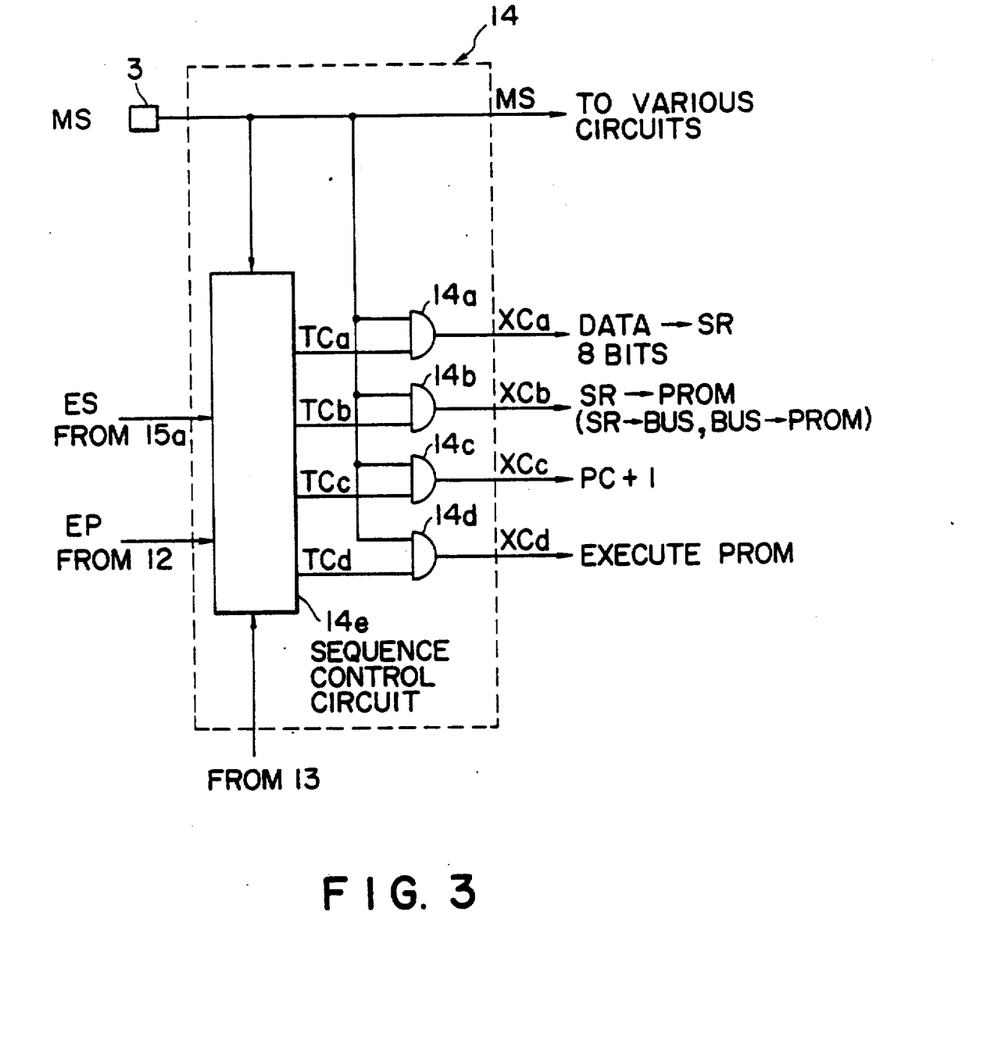
FIG. 3 is a block diagram showing an example of an operation mode control circuit of FIG. 1.
Figure 4:
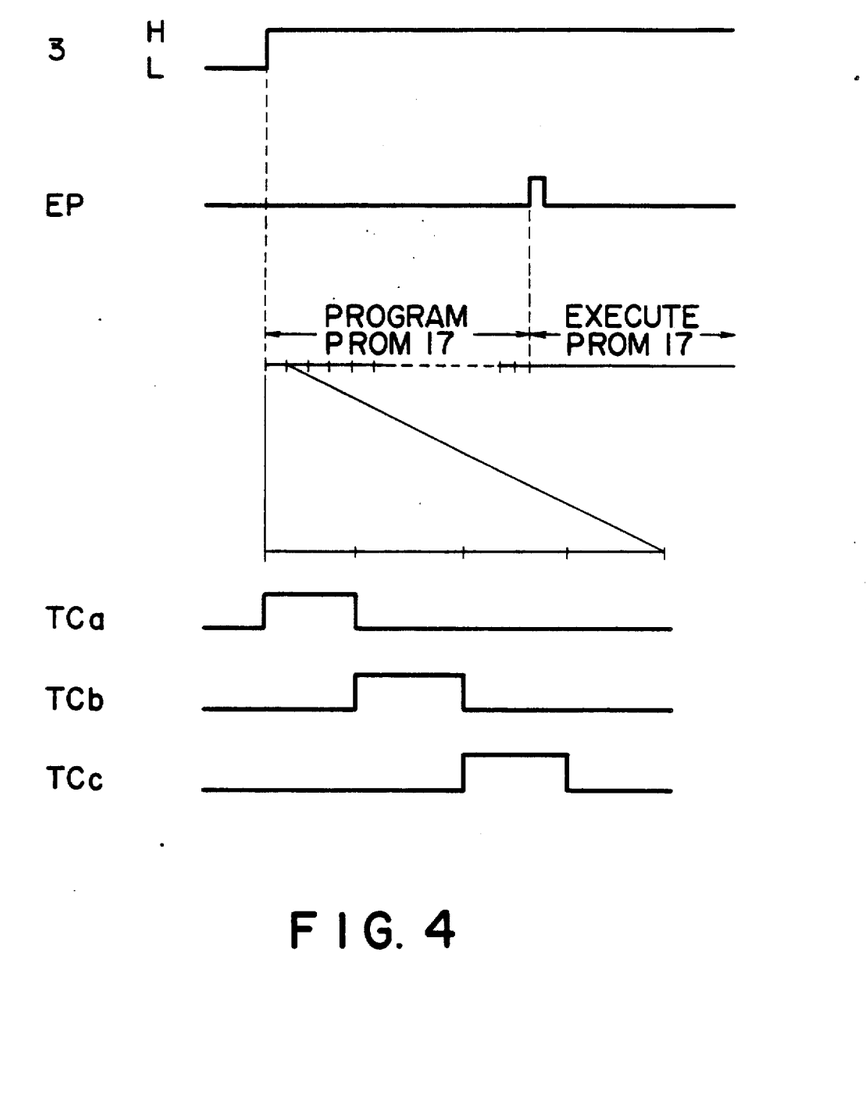
FIG. 4 is a time chart showing various signals and time periods allotted for the respective operations.

The operation mode control circuit 14 also provides control signals for use in operation in the special mode. For this purpose, as shown in FIG. 3, it includes AND gates 14a through 14d and a sequence control circuit 14e. Each of the AND gates 14a through 14d receives at its one input terminal the mode selection signal MS and receives at another input terminal a respective one of control signals TCa through TCd supplied from the sequence control circuit 14e and produces a respective one of control signals XCa through XCd. The sequence control circuit 14e is responsive to the mode selection signal MS rising to "1" for beginning, upon confirmation of the state that the special mode may be entered, to cyclically produce the signals TCa through TCc as shown in FIG. 4. The signal TCa gives the timing for reading the serially-transmitted data into the shift register 15a. The signal TCb is produced when the signal ES is produced, and causes the data in the shift register 15a to be written into the PROM 17. For this to be realized, the data in the shift register 15a is transferred onto the data bus 18. Then, the data on the data bus 16 is written into the appropriate location now being addressed by the program counter 12. During such writing a high voltage, e.g., 21V, is applied to the PROM 17 for a period of several tenths of a msec. Such a voltage may be supplied from the outside of the chip or may be generated inside the chip.

The signal TCc is for incrementing the program counter 12 upon completion of writing each instruction in the PROM 17. As the above-described steps are repeated the instructions of the program are successively written in the PROM 17.

In the illustrated embodiment, the program to be written in the PROM 17 is made to consist of less than 100 steps, and the program counter 12 is arranged to produce a signal EP when its content (the address value) becomes 100 to indicate the end of programming.

When the signal EP is produced, the sequence control circuit 14e causes to produce the signals TCa through TCc and instead begins to produce the signals TCd. When this signal TCd is produced the program stored in the PROM 17 is executed.

The manner of execution of the program in the PROM 17, as shown in FIG. 1 is similar to that of the execution of the program in the ROM 16. That is, the instructions of the program are successively fetched and executed. More specifically, the instruction at the location of the PROM 17 now being designated by the program counter 12 is read out onto the data bus 18, and is latched by the instruction register 10. The instruction decoder 11 decodes the instruction latched in the instruction register 10 and supplies various control signals to various parts of the microcomputer to execute the instruction. When the execution of one instruction is completed, the next address now being designated by the program counter 12 (whose content was incremented upon fetching of the instruction during the preceding cycle) is fetched and then executed. In this way, the instructions of the program stored in the PROM 17 are executed in sequence.

The program stored in the PROM 17 may be executed more than once. When the program already stored in the PROM 17 is to be executed, the step of programming is omitted and the execution of the program in the PROM 17 is immediately started upon entry into the special mode.

When the mode selection signal MS is at "0", the operation mode control circuit 14 permits the program stored in the ROM 16 to be executed. The execution of the program stored in the ROM 16 may be achieved in the following manner.

The instruction at the location of the ROM 16 now being designated by the program counter 12 is read out onto the data bus 18, and is latched by the instruction register 10. The instruction decoder 11 decodes the instruction latched in the instruction register 10 and supplies various control signals to various parts of the microcomputer to execute the instruction. When the execution of one instruction is completed, the next address now being designated by the program counter 12 (whose content was incremented upon fetching of the instruction during the preceding cycle) is fetched and then executed. In this way, the instructions of the program stored in the ROM 16 are executed in sequence. During such an operation, the PROM 17 may be used as a data memory for back-up.

A timing control circuit 13 receives clock pulses CP through a clock pulse terminal 2 and produces timing signals and supplies them to various circuits within the chip 1. In FIG. 1, the operation mode control circuit 14 alone is shown to be connected to receive the signals from the timing control circuit 13, but this is exemplary and does not mean that other circuits are not connected to the timing control circuit 13.

As was described earlier, the PROM 17 may be used to store various program, such as a test program or an optional application program.

The test may be conducted by the manufacturer of the microcomputer. After the test, the test program may be erased. If an EEPROM is used for the PROM 17, the erasure can be achieved automatically. After the erasure, the PROM 17 is ready for a further programming by the manufacture or by the user. The user may conduct its own test (acceptance test) using the PROM 17 to store the user's own test program. An optional application program may thereafter be written in the PROM 17. If the test by the user is not needed, the optional application program may be written by the manufacturer before delivery to the user.

The microcomputer described above has the advantage of improved versatility with a minimum number of terminals. Moreover, if the microcomputer is used for testing, there is an additional advantage that the instruction of the test program is made to be executed at the same speed as the ordinary program. This is because the time required for accessing an external memory, which was necessary with the conventional system, is not necessary.

Figure 5:
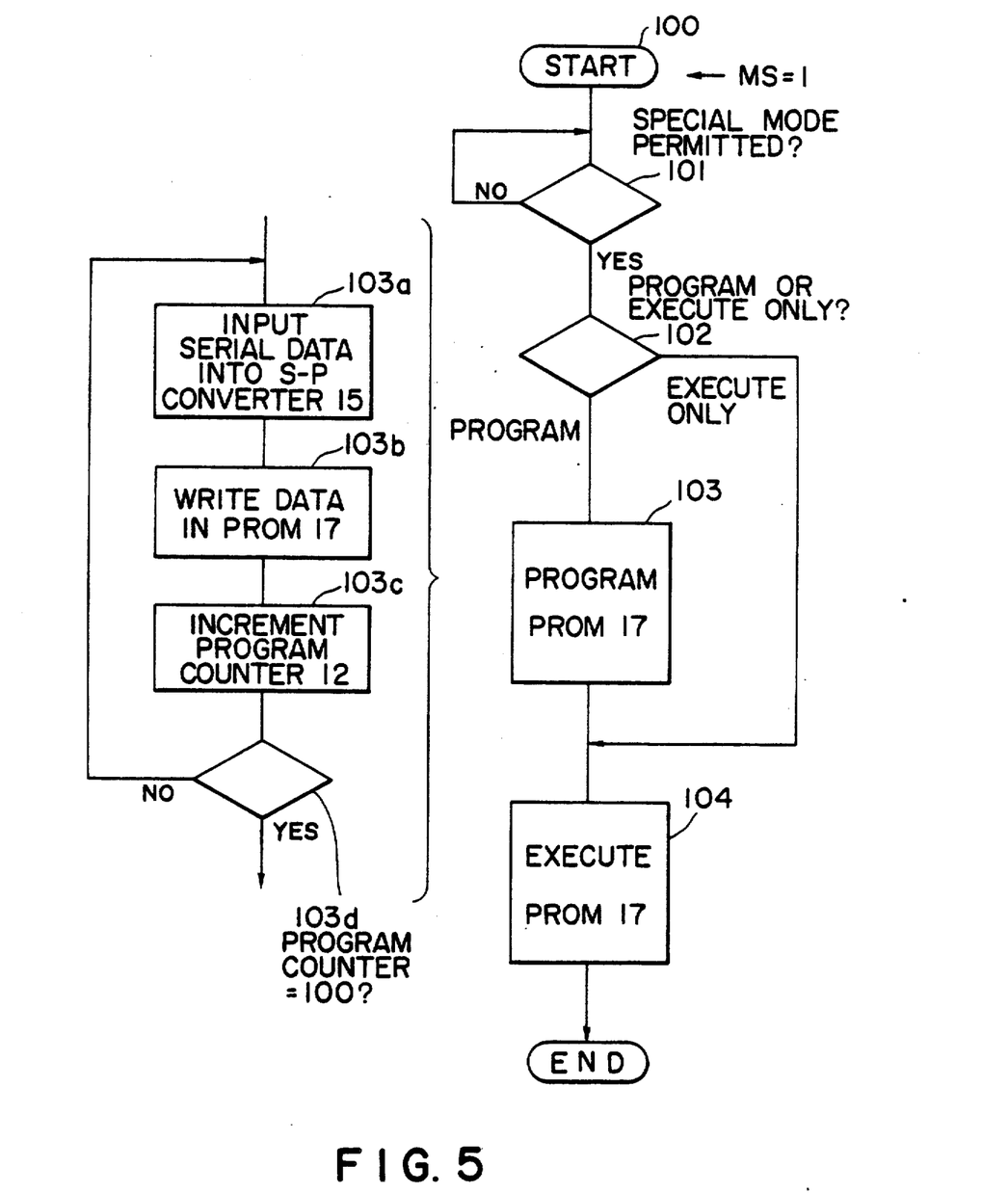
FIG. 5 is a flow chart showing an operation performed under control of a program stored in the ROM of FIG. 1.

In the embodiment described, the control for programming PROM 17 and executing the program within the PROM 17 is made by the sequence control circuit 14e. Alternatively, such control including control of the serial-parallel converter 15 can be made by a program stored in the ROM 16. FIG. 5 shows an operation performed in such a case.

As illustrated, when the mode selection signal MS rises to "1" and the special mode is permitted entry (101), then it is judged whether it is necessary to program the PROM 17 because the desired program has not been written in, or execution of the program may be started immediately because the desired program has already been written in (102). If it is necessary to program, then the programming is conducted (103). That is, the serial data (instruction) is inputted into the shift register 15a (103a), and the parallel data is written into the location of the PROM 17 now being addressed by the program counter 12 (103b). Then, the program counter 12 is incremented (103c). The steps 103a through 103c are repeated until the program counter reaches "100" (103d). Then, the program stored in the PROM 17 is executed (104). If, at the step 102, the PROM 17 is already programmed, the execution of the program in the PROM 17 is immediately started (104). Operations for the execution of the program stored in the PROM 17 are similar to those already described in connection with the embodiment of FIG. 1.

In the embodiment described, a mode selection signal MS consisting of a single bit is supplied through the terminal 3. But the mode selection signal may be supplied through the input/output terminal 4 and may consist of a plurality of bits, e.g., 8 bits, and it may be so arranged that it is judged by means of a program stored in the ROM 16 at the time of the power-on of the microcomputer, whether the data supplied through the input/output terminal 4 is of a specific code, and if it is found to be the specific code, a single-bit signal is set at "1"; otherwise the signal is at "0". This signal may be used in place of the mode selection signal MS of the abovedescribed embodiment.

Figure 6:
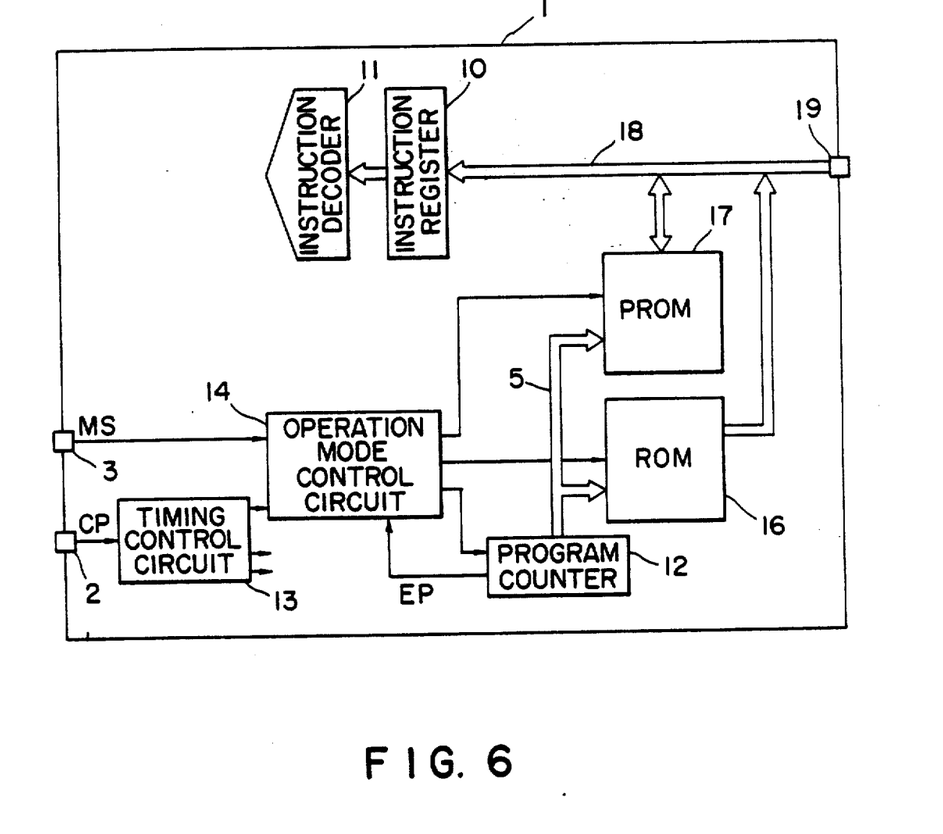
FIG. 6 is a block diagram showing another embodiment of the invention.

In the embodiment of FIG. 1, the data to be written in the PROM 17 is serially inputted through a terminal 4. Alternatively, there may be provided terminals for parallel input. FIG. 6 shows an example of such an arrangement. As illustrated, there are provided a plurality of (e.g., eight) terminals 19 respectively connected to the lines of the data bus 18. The serial-parallel converter 14 of FIG. 1 is eliminated. This embodiment has an advantage over the embodiment of FIG. 1 in that the time required for programming the PROM 17 is shorter. Although the number of terminals is greater than in the embodiment of FIG. 1, it is smaller than the prior art where the address must be supplied from the microcomputer to the external memory.

As has been described, the invention provides a microcomputer having a PROM in addition to a ROM. The PROM may for example be used to store a test program or an optional application program. Accordingly, the versatility of the microcomputer is improved. Moreover, when the PROM is used to store a test program, there is an additional advantage that the instructions of the test program can be made to be executed at the same speed as the instructions of an ordinary program stored in the ROM. The reliability of the test is therefore improved.

What is claimed is:

1. A single-chip microcomputer having a mode selection terminal for receiving a mode selection signal, the mode selection signal having a first state when the microcomputer is to be operable in an application mode and having a second state when the microcomputer is to be operable in a test mode, the microcomputer further having a data terminal to receive serial bits forming instructions for a test program, said microcomputer comprising:

logic circuits;
  a read-only memory for storing an application program, said read-only memory having a plurality of memory locations each identified by an address;
  a programmable read-only memory for storing the test program for testing said logic circuits to verify operability thereof, said programmable read-only memory having a plurality of memory locations each identified by an address;

a data bus coupled to each of said read-only and programmable read-only memories;

program counter means coupled to each of said read-only and programmable read-only memories for designating addresses corresponding to memory locations therein storing application and test programs to be fetched;

means for converting the serial bits forming the instructions for the test program from the data terminal into sets of parallel bits, each of the sets of parallel bits being outputted to said programmable read-only memory when the mode selection signal is in the second state;

mode control means for enabling execution of the application program stored in the memory locations of said read-only memory when the mode selection signal is in the first state, said mode control means sequentially producing first and second signals when the mode selection signal is in the second state;

said programmable read-only memory in response to said first signal storing one of the sets of parallel bits from said converting means;

said program counter means in response to said second signal incrementing the value of the address thereof;

said mode control means successively generating an execution signal after the address designated by said program counter means reaches a predetermined value; and means, in response to said execution signal, for executing the test program stored in memory locations of said programmable read-only memory so that the sets of parallel bits are read out onto the data bus whereby the operability of said logic circuits can be verified.

2. A microcomputer according to claim 1, wherein said programmable read-only memory is an electrically erasable programmable read-only memory.

3. A microcomputer according to claim 1, wherein said program counter means produces a program-end signal when the address designated by said program counter means reaches the predetermined value, and wherein said mode control means enables the execution of the test program when said program-end signal is received.

4. A microcomputer according to claim 1, wherein said converting means includes a shift register for converting the serial bits into the sets of parallel bits and outputting the sets of parallel bits, and shift register control means for controlling said shift register.

5. A microcomputer according to claim 4, wherein said mode control means further outputs into said shift register control circuit a third signal to read the serial bits into said shift register when the mode selection signal is in the second state.

6. A microcomputer according to claim 5, wherein said converting means outputs a conversion completion signal every time one of the sets of parallel bits is outputted to said programmable read-only memory.

7. A microcomputer according to claim 6, wherein said mode control means in response to the conversion completion signal produces said first and second signals, wherein said program counter means produces a program-end signal when the address designated by said program counter means reaches the predetermined value and wherein said mode control means enables the execution of the test program when said program-end signal is received.

8. A microcomputer according to claim 7, wherein said mode control means includes sequence control means for sequentially cyclically outputting the third, first and second signals.

9. A single-chip microcomputer having a mode selection terminal for receiving a mode selection signal, the mode selection signal having a first state when the microcomputer is to be operable in an application mode and having a second state when the microcomputer is to be operable in a test mode, the microcomputer further having a data terminal to receive sets of parallel bits forming instructions for a test program, said microcomputer comprising:

logic circuits;

a read-only memory for storing an application program, said read-only memory having a plurality of memory locations each identified by an address;

a programmable read-only memory for storing the test program for testing said logic circuits to verify operability thereof, said programmable read-only memory having a plurality of memory locations each identified by an address;

a data bus for receiving the sets of parallel bits from the data terminal, the data bus being coupled to each of said read-only memory and said programmable read-only memory;

program counter means coupled to each of said read-only memory and said programmable read-only memory for designating addresses corresponding to the memory locations therein storing the application and test program to be fetched;

mode control means responsive to the mode selection signal for enabling execution of the application program stored in the memory locations of said read-only memory when the mode selection signal is in the first state, said mode control means sequentially producing first and second signals when the mode selection signal is in the second state;

said programmable read-only memory in response to said first signal storing one of the sets of parallel bits from the data bus, and said program counter means in response to said second signal incrementing the value of the address thereof;

said mode control means successively generating an execution signal after the address designated by said program counter means reaches a predetermined value; and means, in response to said execution signal, for executing the test program stored in memory locations of said programmable read-only memory so that the test program is read out onto the data bus whereby the operability of said logic circuits can be verified.

10. A microcomputer according to claim 9, wherein said programmable read-only memory is an electrically erasable programmable read-only memory.

11. A microcomputer according to claim 9, wherein said program counter means produces a program-end signal when the address designated by said program counter means reaches said predetermined value, and wherein said mode control means enables execution of the test program when said program-end signal is received.

12. A microcomputer according to claim 11, wherein said mode control means includes sequence control means for sequentially cyclically outputting the first and second signals.

13. A method of testing a single-chip microcomputer including logic circuit; a read-only memory for storing an application program; and a programmable read-only memory for storing a test program for testing the logic circuits to verify operability thereof, the programmable read-only memory having a plurality of memory locations each identified by an address; said method of testing the microcomputer comprising the steps of:
   inputting a test mode signal through a mode selection terminal of the microcomputer;
   inputting serial bits forming instructions for the test program through a data terminal of the microcomputer;
   converting the serial bits forming instructions for the test program into sets of parallel bits when the test mode signal is inputted, said step of converting resulting in the generation of a conversion completion signal every time one of the sets of parallel bits is converted;
   designating one of the addresses of the programmable read-only memory when the test mode signal is inputted;
   producing first and second signals in response to said conversion completion signal;
   storing in response to said first signal one of the sets of parallel bits into the designated memory locations of the programmable read-only memory;
   incrementing the value of the designated address in response to said second signal; and
   automatically executing the test program stored in the memory locations of the programmable read-only memory when the address reaches a predetermined value.

14. A method according to claim 13, wherein following the step of inputting serial bits, said method additionally includes the substep of sequentially producing a third signal for reading said serial bits into a shift register.

15. A method according to claim 14, wherein said substep is executed in advance of said step of producing said first and second signals so as to cylically produce said third, first and second signals.

16. A method of testing a single-chip microcomputer including logic circuits; a read-only memory for storing an application program; and a programmable read-only memory for storing a test program for testing the logic circuits to verify operability thereof, the programmable read-only memory having a plurality of memory locations each identified by an address; said method of testing the microcomputer comprising the steps of:
   inputting a test mode signal through a mode selection terminal of the microcomputer;
   inputting sets of parallel bits forming instructions for the test program through a data terminal of the microcomputer;
   designating one of the addresses of the programmable read-only memory when the test mode signal is inputted;
   sequentially producing first and second signals when the test mode is inputted;
   storing in response to said first said signal one of the sets of parallel bits into the designated memory locations of the programmable read-only memory;
   incrementing the value of the designated address in response to said second signal; and
   automatically executing the test program stored in the memory locations of the programmable read-only memory when the address reaches a predetermined value.

* * * * *